United States Patent [19]

Spietschka et al.

[11] Patent Number: 4,689,087
[45] Date of Patent: Aug. 25, 1987

[54] PROCESS FOR THE PREPARATION OF AN ORGANIC PIGMENT ON THE BASIS OF 4,4′,7,7′-TETRACHLORO-THIO-INDIGO

[75] Inventors: Ernst Spietschka, Idstein/Taunus; Manfred Urban, Wiesbaden, both of Fed. Rep. of Germany

[73] Assignee: Hoechst Aktiengesellschaft, Fed. Rep. of Germany

[21] Appl. No.: 796,514

[22] Filed: Nov. 8, 1985

Related U.S. Application Data

[63] Continuation of Ser. No. 522,412, Aug. 11, 1983, abandoned.

[30] Foreign Application Priority Data

Aug. 13, 1982 [DE] Fed. Rep. of Germany ....... 3230125

[51] Int. Cl.$^4$ ............................................... C09B 7/00
[52] U.S. Cl. .................................... 106/309; 548/459
[58] Field of Search ................... 106/309, 23; 548/457, 548/459

[56] References Cited

U.S. PATENT DOCUMENTS

| | | | |
|---|---|---|---|
| 2,995,552 | 8/1961 | Genta | 260/242.2 |
| 4,229,583 | 10/1980 | Spietschka et al. | 549/52 |
| 4,284,789 | 8/1981 | Spietschka et al. | 549/52 |
| 4,304,919 | 12/1981 | Buhler et al. | 549/52 |

FOREIGN PATENT DOCUMENTS 2504935 10/1977 Fed. Rep. of Germany.
1497964 1/1978 United Kingdom.

Primary Examiner—Amelia B. Yarbrough
Attorney, Agent, or Firm—Connolly and Hutz

[57] ABSTRACT

A process for the preparation of 4,4′,7,7′-tetrachloro-thioindigo pigment which comprises treating a finely divided crude 4,4′,7,7′-tetrachloro-thioindigo pigment in anhydrous form at temperatures of from 50° to 180° C. with a nitroaromatic substance which is volatile in steam and has a melting point of 50° C. or below under normal conditions.

5 Claims, No Drawings

PROCESS FOR THE PREPARATION OF AN ORGANIC PIGMENT ON THE BASIS OF 4,4',7,7'-TETRACHLORO-THIO-INDIGO

This application is a continuation of our copending application Ser. No. 522,412, filed Aug. 11, 1983 and now abondoned.

It is known that 4,4',7,7'-tetrachloro-thioindigo can be prepared by oxidation of 4,7-dichloro-3-hydroxythionaphthene with air, potassium dichromate or -cyanoferrate (III) or iron (III) chloride (German Pat. No. 194,237), or with sodium peroxodisulfate (German Pat. No. 2,504,935), or by treating 2,5-dichlorophenyl-thioglycolic acid with chlorosulfonic acid (German Pat. No. 241,910). While the pigments prepared according to German Pat. No. 194,237 are obtained in finely divided form, those prepared according to German Pat. No. 241,910 need an additional fine distribution according to known methods, for example by means of salt grinding and optionally a subsequent solvent treatment. It is furthermore known that an excellent 4,4',7,7'-tetrachloro-thioindigo pigment is obtained by dissolving 4,4',7,7'-tetrachloro-thioindigo having a purity degree of at least 80%, preferably above 90%, in chlorosulfonic acid, hydrolyzing the solution obtained at temperatures of below 20° C., isolating the precipitate formed and after-treating it with addition of an organic solvent (German Offenlegungsschrift No. 2,504,962). The amount of chlorosulfonic acid necessary for dissolving the crude product depends on the purity of the tetrachloro-thioindigo. Suitable organic solvents are for example benzene, lower alkylbenzenes such as toluene, xylene, ethylbenzene, furthermore aromatic chlorohydrocarbons such as chlorobenzene, dichlorobenzenes, trichlorobenzenes and the mixtures thereof. The after-treatment is carried out at temperatures of about 20° to about 180° C.

In the course of the further development there has been found that a pigment having an extraordinarily improved flow behaviour at high pigment concentration is obtained by treating any finely divided crude 4,4',7,7'-tetrachloro-thioindigo pigment in anhydrous form with nitroaromatic substances at temperatures of from 50° to 180° C., preferably 100° to 150° C. The pigment so obtained is furthermore distinguished by an excellent stability to flocculation.

By nitroaromatic substances used according to the invention there are to be understood those which are volatile in steam and have a melting point of 50° C. or below under normal conditions, for example nitrobenzene, nitrotoluenes, nitroxylene, nitroanisol or nitrophenol. By "anhydrous form" there is to be understood that the crude 4,4',7,7'-tetrachloro-thioindigo pigment is treated with the cited nitroaromatic substances in the absence of water. This can be achieved for example by either starting from a dried crude pigment or removing the water from the crude pigment by distillation at low temperatures. Also, surface-active compounds can be added before, during or after the treatment with the solvent.

The following examples illustrate the invention.

EXAMPLE 1

30 Parts by weight of crude 4,4',7,7'-tetrachloro-thioindigo pigment (prepared according to German Pat. No. 241,910 with additional salt grinding sodium sulfate 1:5) are introduced at room temperature into 300 parts by weight of nitrobenzene. The batch is heated to 150° C., and stirring is continued for 3 hours at this temperature. Thereafter, the batch is allowed to cool to 90° C., 50 parts of water are added, and the nitrobenzene is distilled off by means of steam. Subsequently, the pigment is suction-filtered and dried. 29.4 Parts by weight of pigment are obtained which is distinguished by its low viscosity and excellent stability to flocculation in varnishes having a high pigment concentration.

EXAMPLE 2

30 Parts by weight of crude 4,4',7,7'-tetrachloro-thioindigo pigment (prepared by reprecipitation from chlorosulfonic acid according to German Offenlegungsschrift No. 2,504,962) are introduced at room temperature into 300 parts by weight of nitrobenzene. The batch is heated to 150° C., and stirring is continued for 3 hours at this temperature. Subsequently, the batch is allowed to cool to 90° C., 50 parts of water are added, and the nitrobenzene is distilled off with steam. Thereafter, the pigment is suction-filtered and dried. 20.2 Parts by weight of pigment are obtained which is distinguished by low viscosity and excellent stability to flocculation in varnishes at high pigment concentration.

EXAMPLE 3

30 Parts by weight of crude 4,4',7,7'-tetrachloro-thioindigo pigment (prepared according to German Pat. No. 2,504,935) are introduced at room temperature into 300 parts by weight of nitrobenzene. The batch is heated to 100° C., maintained at this temperature for 3 hours, and subsequently, stirring is continued for a further 3 hours at 150° C. The further work-up is as described in Examples 1 and 2. 29.5 Parts by weight of pigment are obtained which is distinguished by low viscosity and excellent stability to flocculation in varnishes having a high pigment concentration.

EXAMPLE 4

30 Parts by weight of the crude 4,4',7,7'-tetrachloro-thioindigo pigment of Example 3 are introduced at room temperature into 300 parts by weight of nitrobenzene. The batch is heated to 150° C., and stirring is continued for 3 hours at this temperature. Subsequently, the batch is allowed to cool to room temperature, the product is suction-filtered and washed with methanol until it is free from nitrobenzene. After drying, 29.1 parts by weight of pigment are obtained which is distinguished by low viscosity and excellent stability to flocculation in varnishes having a high pigment concentration.

EXAMPLE 5

30 Parts by weight of the crude 4,4',7,7'-tetrachloro-thioindigo pigment of Example 3 are stirred in the form of the moist press cake into 300 parts by weight of nitrobenzene, distilled at 30° C. and 20 mm Hg until free from water, and subsequently heated for 2 hours at 150° C. The further work-up is as in Example 1 and 2. 29.3 Parts by weight of pigment are obtained which is distinguished by its low viscosity and excellent stability to flocculation in varnishes having a high pigment concentration.

EXAMPLE 6

Operations are as described in Example 1; however, the nitrobenzene is replaced by the same amount of nitrotoluene. 20.3 Parts by weight of pigment are obtained which is distinguished by its low viscosity and excellent stability to flocculation in varnishes having a high pigment concentration.

What is claimed is:

1. A process for the preparation of 4,4',7,7'-tetrachloro-thioindigo pigment which comprises treating a finely divided crude 4,4',7,7'-tetrachloro-thioindigo pigment in anhydrous form at temperatures of from 50° to 180° C. with a nitroaromatic substance which is volatile in steam and has a melting point of 50° C. or below under normal conditions.

2. The process as claimed in claim 1, which comprises treating the crude pigment at temperatures of from 100° to 150° C.

3. The process as claimed in claim 1, which comprises using nitrobenzene as nitroaromatic substance.

4. A process for improving the flow behavior at high pigment concentration and for improving the stability to flocculation of crude 4,4',7,7'-tetrachloro-thioindigo pigment, comprising the steps of:

obtaining the finely divided, crude 4,4',7,7'-tetrachloro-thioindigo pigment in anhydrous form, treating said finely divided, crude 4,4',7,7'-tetrachloro-thioindigo pigment in the absence of water at temperatures of from 50° to 180° C. with a nitroaromatic substance which is volatile in steam and has a melting point of 50° C. or lower under normal conditions, and recovering the resulting improved pigment.

5. The process as claimed in claim 4 wherein the resulting improved pigment is recovered by adding water, distilling off the nitroaromatic substance by means of steam and filtering and drying the improved pigment.

* * * * *